(12) United States Patent
Oohata et al.

(10) Patent No.: US 11,125,863 B2
(45) Date of Patent: Sep. 21, 2021

(54) CORRECTION DEVICE, CORRECTION METHOD, AND DISTANCE MEASURING DEVICE

(71) Applicant: SONY CORPORATION, Tokyo (JP)

(72) Inventors: Toyoharu Oohata, Tokyo (JP); Takahiro Koyama, Kanagawa (JP); Tomoki Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 461 days.

(21) Appl. No.: 15/756,712

(22) PCT Filed: Jun. 7, 2016

(86) PCT No.: PCT/JP2016/002755
§ 371 (c)(1),
(2) Date: Mar. 1, 2018

(87) PCT Pub. No.: WO2017/042993
PCT Pub. Date: Mar. 16, 2017

(65) Prior Publication Data
US 2018/0259629 A1    Sep. 13, 2018

(30) Foreign Application Priority Data

Sep. 10, 2015    (JP) .............................. JP2015-178558

(51) Int. Cl.
*G01S 7/497*    (2006.01)
*G01S 17/10*    (2020.01)
(Continued)

(52) U.S. Cl.
CPC .............. *G01S 7/497* (2013.01); *G01C 3/06* (2013.01); *G01J 11/00* (2013.01); *G01S 7/4861* (2013.01);
(Continued)

(58) Field of Classification Search
None
See application file for complete search history.

(56) References Cited

U.S. PATENT DOCUMENTS 3,846,028 A * 11/1974 List ........................... G01J 1/42
356/218
6,737,642 B2 * 5/2004 Syage ................. H01J 49/0036
250/281

(Continued)

FOREIGN PATENT DOCUMENTS

| JP | 08-105971 A | 4/1996 |
|----|-------------|--------|
| JP | 2007-147322 A | 6/2007 |
| JP | 2015-075334 A | 4/2015 |

OTHER PUBLICATIONS

LIM, Hansang and PARK, Jaehong, Comparison of time corrections using charge amounts, peak values, slew rates, and signal widths in leading-edge discriminators, Review of Scientific Instruments, Jun. 2003, vol. 74, No. 6, (Year: 2003).*

(Continued)

*Primary Examiner* — Yuqing Xiao
*Assistant Examiner* — Amir J Askarian
(74) *Attorney, Agent, or Firm* — Chip Law Group

(57) ABSTRACT

A correction device including a photon number counting unit that counts a photon number on the basis of an output signal output from a light receiving unit, a correction value acquiring unit that acquires a correction value corresponding to the photon number, and a correction unit that performs correction based on the correction value.

13 Claims, 10 Drawing Sheets

(51) Int. Cl.
  *G01S 7/4861* (2020.01)
  *G01S 7/4865* (2020.01)
  *G01C 3/06* (2006.01)
  *G01J 11/00* (2006.01)

(52) U.S. Cl.
  CPC ............ *G01S 7/4865* (2013.01); *G01S 17/10* (2013.01); *G01J 2011/005* (2013.01)

(56) References Cited

U.S. PATENT DOCUMENTS

| | | | | |
|---|---|---|---|---|
| 7,301,608 | B1* | 11/2007 | Mendenhall | G01S 17/18 356/4.01 |
| 2011/0284750 | A1* | 11/2011 | Nakamura | G01T 3/06 250/362 |
| 2012/0037811 | A1* | 2/2012 | Dunn | G01T 7/00 250/391 |
| 2012/0112076 | A1* | 5/2012 | Rosson | G01T 7/00 250/361 R |
| 2013/0214168 | A1 | 8/2013 | McDaniel et al. | |
| 2013/0236171 | A1* | 9/2013 | Saunders | H04B 10/07953 398/26 |
| 2014/0037135 | A1* | 2/2014 | Kutliroff | G06F 3/017 382/103 |
| 2015/0192676 | A1* | 7/2015 | Kotelnikov | G01S 17/89 356/5.03 |
| 2016/0070005 | A1* | 3/2016 | Sagoh | G01T 1/17 250/361 R |
| 2016/0356890 | A1* | 12/2016 | Fried | G01S 17/42 |

OTHER PUBLICATIONS

Eckl, J. J. et al., High accurate range finding with SPADs at 1064nm, Proc. of SPIE, 2013, vol. 8773, pp. 87730A-1-87730A-7, (Year: 2013).*

Nils J. Krichel et al "Resolving range ambiguity in a photon counting depth imager operating at kilometer distances" Apr. 26, 2010 / vol. 18, No. 9 / OPTICS Express 9192 (Year: 2010).*

"Photon-number resolving detector based on a series array of superconducting nanowires" S. Jahanmirinejad, G. Frucci, F. Mattioli, D. Sahin, A. Gaggero, R. Leoni, and A. Fiore (Year: 2012).*

"Proposal for a superconducting photon number resolving detector with large dynamic range" Saeedeh Jahanmirinejad* and Andrea Fiore (Year: 2012).*

"Photon-number resolving and distribution verification using a multichannel superconducting nanowire single-photon detection system" Dengkuan Liu, Lixing You,* Yuhao He, Chaolin Lv, Sijing Chen, Ling Zhang, Zhen Wang, and Xiaoming Xie (Year: 2014).*

Lim, et al., "Comparison of Time Corrections Using Charge Amounts, Peak Values, Slew Rates, and Signal Widths in Leading-Edge Discriminators", Review of Scientific Instruments, vol. 74, Issue 6, Jun. 2003, pp. 3115-3119.

Eckl, et al., "High Accurate Range Finding with SPADs at 1064nm", Proceedings of SPIE, vol. 8773, 2013, 07 pages.

He, et al., "Range Walk Error Correction Using Prior Modeling in Photon Counting 3D Imaging Lidar", Fifth International Symposium on Photoelectronic Detection and Imaging, Proceedings of SPIE, vol. 8905, 2013, 11 pages.

International Search Report and Written Opinion of PCT Application No. PCT/JP2016/002755, dated Aug. 23, 2016, 12 pages.

Lim, et al., "Comparison of Time Corrections Using Charge Amounts, Peak Values, Slew Rates, and Signal Widths in Leading-Edge Discriminators", Review of Scientific Instruments, vol. 74, No. 6, Jun. 2003, pp. 3115-3119.

Eckl, et al., "High Accurate Range Finding with SPADs at 1064nm", Proc. of SPIE, 2013, vol. 8773, pp. 87730A-1-87730A-7.

He, et al., "Range Walk Error Correction Using Prior Modeling in Photon Counting 3D Imaging Lidar", Proc. of SPIE, 2013, vol. 8905, pp. 89051D-1-89051D-11.

Lim, et al., "Comparison of Time Corrections Using Charge Amounts, Peak Values, Slew Rates, and Signal Widths in Leading-Edge Discriminators", American Institute of Physics, vol. 74, No. 6, Jun. 2003, pp. 3115-3119.

Eckl, et al., "High Accurate Range Finding with SPADs at 1064nm", Proc. of SPIE, vol. 8773, 2013, pp. 87730A-1-87730A-7.

He, et al., "Range Walk Error Correction Using Prior Modeling in Photon Counting 3D Imaging Lidar", Proc. of SPIE, vol. 8905, 2013, pp. 89051 D-1-89051 D-11.

* cited by examiner

CORRECTION DEVICE, CORRECTION METHOD, AND DISTANCE MEASURING DEVICE

CROSS REFERENCE TO RELATED APPLICATIONS

This application is a U.S. National Phase of International Patent Application No. PCT/JP2016/002755 filed on Jun. 7, 2016 which claims priority benefit of Japanese Patent Application No. JP 2015-178558 filed in the Japan Patent Office on Sep. 10, 2015. Each of the above-referenced applications is hereby incorporated herein by reference in its entirety.

TECHNICAL FIELD

The present disclosure relates to a correction device, a correction method, and a distance measuring device.

BACKGROUND ART

Conventionally, a distance measuring device is known that emits pulsed light to a distance measurement target, receives reflected pulsed light from the target, and measures time from when the pulsed light is emitted until when the reflected pulsed light is received (also referred to as Time Of Flight (TOF)), to measure a distance to the measurement target (see Patent Document 1 below, for example).

CITATION LIST

Patent Document
Patent Document 1: Japanese Patent Application Laid-Open No. 2007-147322

SUMMARY OF THE INVENTION

Problems to be Solved by the Invention

In a field of such a distance measuring device, it is desired to perform an appropriate correction for a possible error to improve accuracy of distance measurement.

Accordingly, it is an object of the present disclosure to provide a correction device, a correction method, and a distance measuring device capable of performing appropriate correction to the error.

Solutions to Problems

To solve the above problem, the present disclosure is, for example,
a correction device including:
a photon number counting unit that counts a photon number on the basis of an output signal output from a light receiving unit;
a correction value acquiring unit that acquires a correction value corresponding to the photon number; and
a correction unit that performs correction based on the correction value.

The present disclosure is, for example,
a correction method including:
counting a photon number on the basis of an output signal output from a light receiving unit with a photon number counting unit;
acquiring a correction value corresponding to the photon number with a correction value acquiring unit; and
performing correction based on the correction value with a correction unit.

The present disclosure is, for example,
a distance measuring device including:
a photon number counting unit that counts a photon number on the basis of an output signal output from a light receiving unit;
a correction value acquiring unit that acquires a correction value corresponding to the photon number;
a correction unit that performs correction based on the correction value; and
a distance calculating unit that uses a result of the correction to calculate a distance to a distance measurement target.

Effects of the Invention

According to at least one embodiment of the present disclosure, an appropriate correction can be performed for the error. Note that, the effect described here is not necessarily limited, and may be any effect described in the present disclosure. In addition, the contents of the present disclosure are not to be construed as being limited by the exemplified effect.

MODE FOR CARRYING OUT THE INVENTION

Hereinafter, embodiments and the like of the present disclosure will be described with reference to the drawings. Note that, description will be made in the following order.

<Summary of Embodiment>
<First Embodiment>
<Second Embodiment>
<Third Embodiment>
<Fourth Embodiment>
<Modifications>

The embodiments and the like described below are preferred specific examples of the present disclosure, and the contents of the present disclosure are not limited to these embodiments and the like.

"About the Walk Error"

To facilitate understanding of the present disclosure, first, a walk error (may be referred to as a time walk) will be described that can occur in a distance measuring device that performs distance measurement by an optical method. Note that, when being briefly described, the distance measuring device that performs the distance measurement by the optical method is a device that measures a time difference between light emission timing and input timing of returning light of the light reflected by an object (distance measurement target), and multiplies the time difference by the speed of light, and then divides the multiplied time difference by two to obtain a distance to the distance measurement target.

In the distance measuring device, it is necessary to detect light receiving timing of reflected light whose intensity largely changes in accordance with the distance, light reflectance, light scattering characteristic, and the like of the object. A signal waveform output from a light receiving element to which the reflected light is input and the signal amplification circuit generally has a finite pulse rise time (100 picoseconds (ps) or more), and intensity of an output signal (appropriately referred to as a light receiving signal) output from the light receiving element also changes in accordance with intensity of input light input to the light receiving element.

To such a light receiving signal, processing is performed that uses a binarization circuit (such as a comparator) having a predetermined detection threshold value, to determine timing at which a level (signal intensity) of the light receiving signal exceeds the threshold value, as timing at which light is received. A method for detecting, by such processing, the timing at which light is received is referred to as a leading edge detection method or the like. Here, as described above, due to the finite rise time of the light receiving signal, this timing (a delay time from a signal rise start to detection) varies depending on difference in light intensity of the reflected light.

Figure 1:
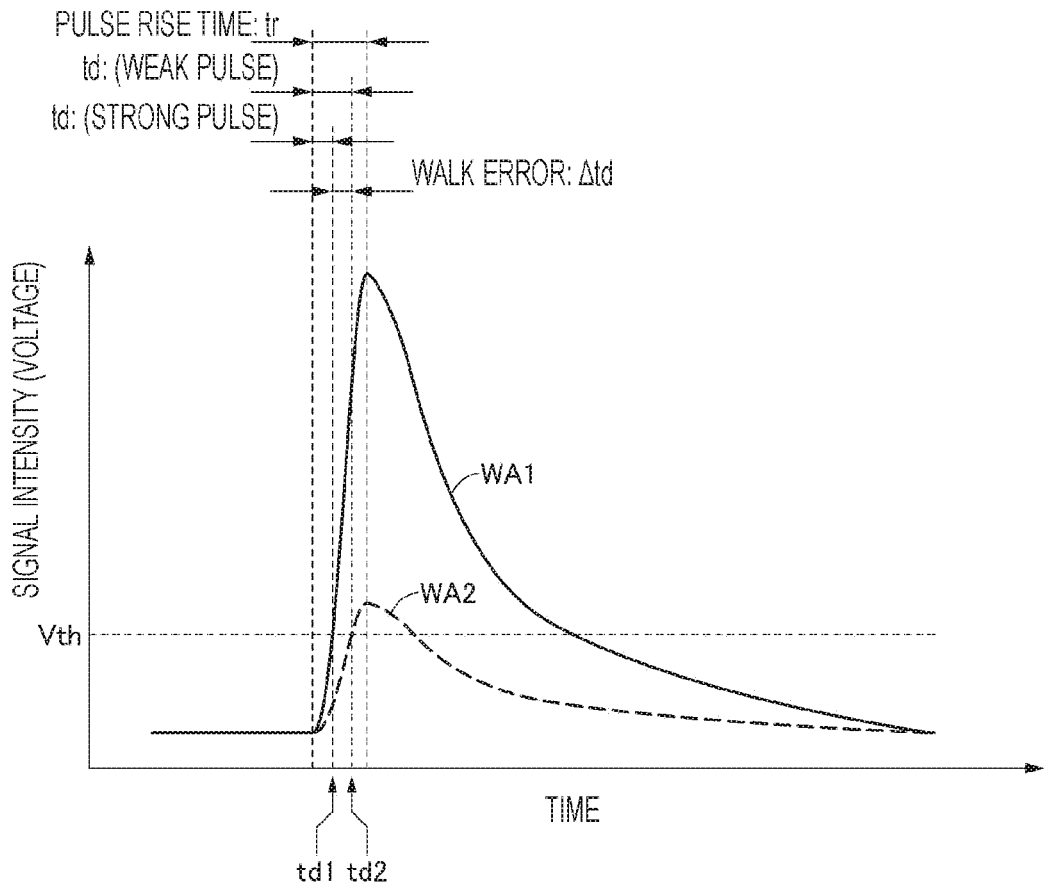
FIG. 1 is a diagram for explaining a walk error.

Description will be made specifically with reference to FIG. 1. In FIG. 1, the horizontal axis represents time and the vertical axis represents the signal intensity (voltage level) of the light receiving signal. Two waveforms WA1 and WA2 are schematically illustrated in FIG. 1, and the waveform WA1 illustrates a waveform of reflected light with strong light intensity, and the waveform WA2 illustrates a waveform of reflected light with weak light intensity. Then, a voltage threshold value Vth is set for determining the light receiving timing.

It is assumed that reflected lights respectively having the waveforms WA1 and WA2 are received by a light receiving unit, and the light receiving signals of respective signal waveforms such as the waveforms WA1 and WA2 are output from the light receiving unit. Here, as illustrated in FIG. 1, an error (shift) $\Delta td$ (=td2−td1) occurs between timing td1 at which the waveform WA1 reaches the threshold value Vth and timing td2 at which the waveform WA2 reaches the threshold value Vth. By this $\Delta td$, in a case of the reflected light having a weak light intensity, the distance to the distance measurement target is calculated to be long. A temporal error (shift) that can be caused by the difference in light intensity of reflected light in this way is the walk error.

For example, to obtain 1 centimeter (cm) as a distance measurement resolution, it is necessary to obtain high resolution of 67 ps as a resolution of light input timing measurement. In addition, the light emitted to the object diffusely reflecting light spreads spatially, and an amount of light entering a separated light receiving element is a small portion of an amount of light emitted from a light source, so that it is necessary to use a light receiving element with a large-area and high-sensitivity. A pulse response output waveform of such a highly sensitive light receiving element typically has a rise time of 1 nanosecond (ns) or more, and in that case, the walk error also is 1 ns at the maximum. To obtain the distance measurement resolution and an accuracy of 1 cm, it is desirable that this shift amount can be corrected to an error of about 67 ps or less.

By the way, it can be considered that a photodiode (PD) or a linear mode (also referred to as a continuous mode) avalanche photodiode (APD) is used as the light receiving element constituting the light receiving unit in the distance measuring device described above. Then, a method can be considered that uses such a light receiving unit to handle an output signal having a continuous peak value and an integrated value in accordance with tens or more of photons detection light receiving intensity.

The Photodiode and the avalanche photodiode show continuous input/output characteristic, and generally, the intensity of the output signal is substantially proportional to the light input intensity. To obtain an output signal larger than noise generated in an electric circuit such as thermal noise, it is necessary to input tens or more of photons in a case of the avalanche photodiode, or hundreds or more in a case of the photodiode. Since the thermal noise has a property that it increases in proportion to the square root of the frequency band of the signal, in a case where extremely weak light of tens of photons or less is received by the photodiode or avalanche photodiode, it is difficult to detect the light receiving timing in a time region around 1 ns.

Figure 2:
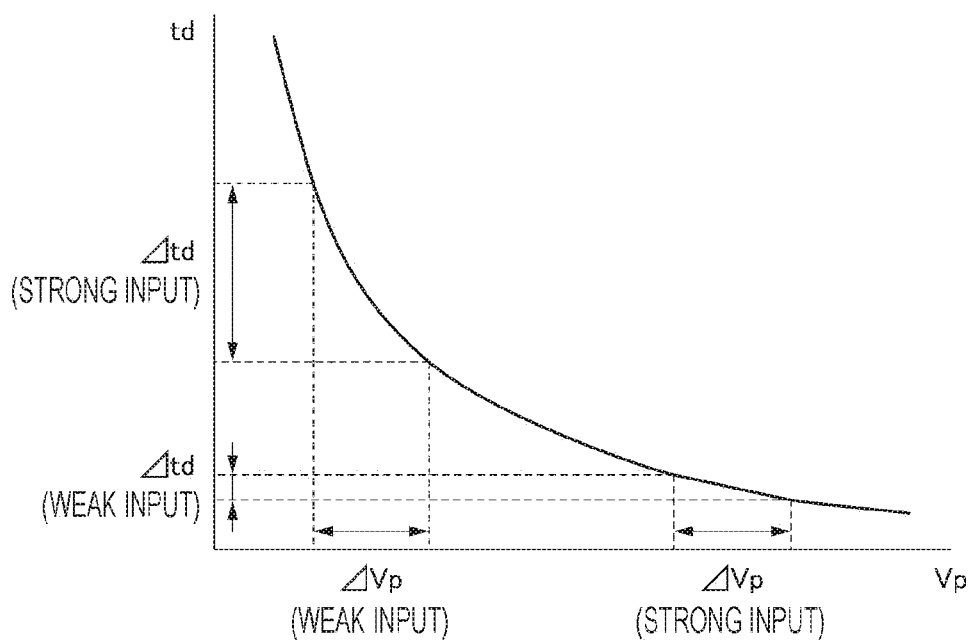
FIG. 2 is a diagram for explaining that a correction error of the walk error becomes large due to a light receiving element.

Further, in detecting the timing with the leading edge detection method, in a case where the rise of the signal is linear, that is, in a case where the signal intensity is proportional to time, a relationship between a detection delay time (walk error) td and a peak voltage (peak value) Vp of the signal is a generally inversely proportional relationship as the curve illustrated in FIG. 2. Note that, in FIG. 2, the change amount $\Delta td$ of the walk error corresponding to the noise amount $\Delta Vp$ appearing on the peak value is also described. As illustrated in FIG. 2, in a case where the light intensity is weak, the change amount $\Delta td$ of the walk error with respect to a change of the pulse intensity is large, so that the change amount $\Delta td$ of the walk error is large even if the noise amount $\Delta Vp$ is the same as the signal with strong light intensity, and it is difficult to obtain necessary timing measurement accuracy.

Further, the continuous input/output characteristic is shown, so that an interpolation circuit is also necessary that performs interpolation from limited data points and outputs a correction value corresponding to a continuous value. As described above, when the photodiode or the avalanche photodiode whose output value is continuous is used, a walk error correction error with weak light becomes large even at a detectable intensity level, and consequently, the timing measurement accuracy is also degraded, and a scale of the circuit also becomes large. That is, it is desirable to be able to appropriately correct the above-described walk error while adopting a configuration capable of receiving even weak light (light with a small photon number) as the light receiving unit. Description will be made of a plurality of embodiments and the like of the present disclosure that has been made in view of the above points.

Summary of Embodiment

Figure 3:
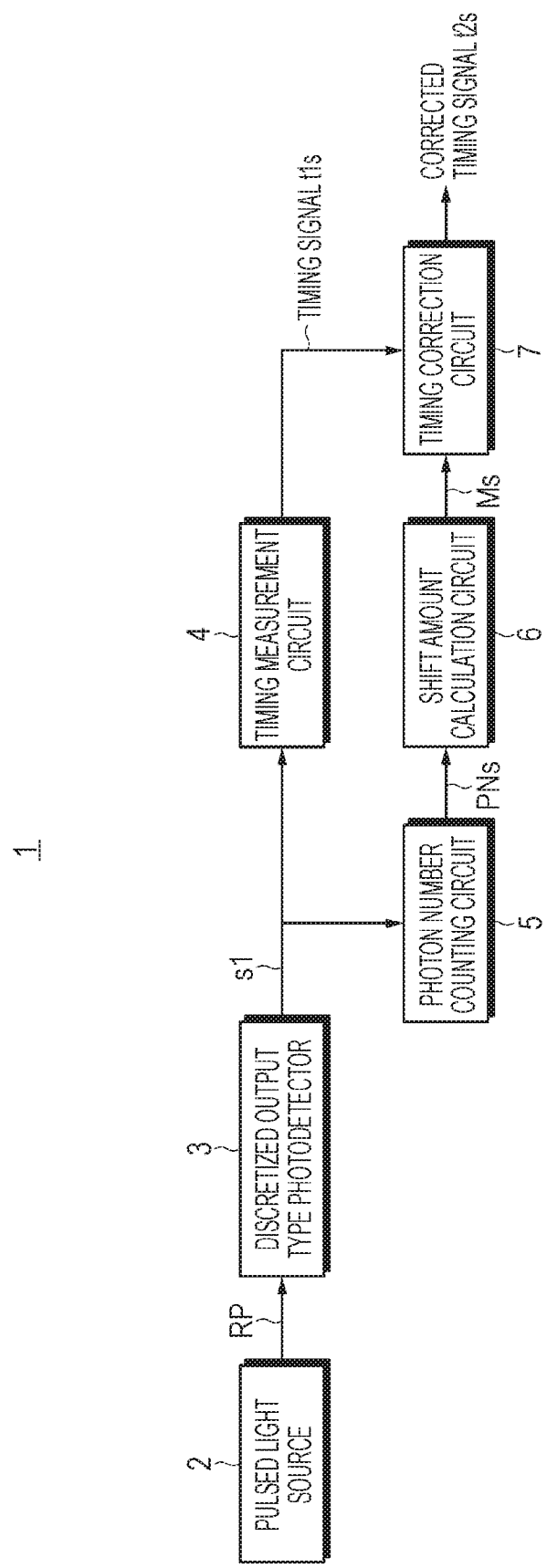
FIG. 3 is a block diagram for explaining a summary of an embodiment of the present disclosure.

First, a summary of an embodiment (for example, a first embodiment) of the present disclosure will be described for ease of understanding. The present disclosure can be configured as a correction device as an example. A correction device 1 illustrated in FIG. 3 includes, for example, a pulsed light source 2, a discretized output type photodetector 3 that is an example of a light receiving unit, a timing measurement circuit 4 that is an example of a measuring unit, a photon number counting circuit 5 that is an example of a photon number counting unit, a shift amount calculation circuit 6 that is an example of a correction value acquiring unit, and a timing correction circuit 7 that is an example of a correction unit.

Operation of the correction device 1 will be briefly described. For example, pulsed light is emitted from the pulsed light source 2. The pulsed light emitted from the pulsed light source 2 is reflected by a distance measurement target and input to the discretized output type photodetector 3 as reflected pulsed light RP. Along with reception of the reflected pulsed light RP, a signal s1 is output from the discretized output type photodetector 3. The signal s1 is input to the timing measurement circuit 4. The timing measurement circuit 4 measures timing t1 at which a voltage level of the signal s1 exceeds a threshold value Vth, and outputs a timing signal t1s indicating the timing t1 to the timing correction circuit 7.

Meanwhile, the signal s1 output from the discretized output type photodetector 3 is also input to the photon number counting circuit 5. The photon number counting circuit 5 obtains a photon number PN received by the discretized output type photodetector 3 on the basis of the signal s1, and outputs a photon number signal PNs indicating the photon number PN to the shift amount calculation circuit 6. The shift amount calculation circuit 6 acquires a temporal shift amount M with respect to timing of the reflected pulsed light that is a reference on the basis of the photon number PN, and outputs a signal Ms indicating the shift amount M to the timing correction circuit 7. The timing correction circuit 7 corrects the timing t1 on the basis of the shift amount M to acquire corrected timing t2, and outputs a timing signal t2s indicating the timing t2.

Note that, although not illustrated, the timing signal t2s is used in, for example, distance calculation processing in subsequent stage processing. That is, a round-trip distance to the distance measurement target is calculated by multiplying a difference between timing at which the pulsed light (reference light) emitted from the pulsed light source 2 is received and the timing t2 by the speed of light, and the distance to the distance measurement target is calculated by dividing the round-trip distance by two. A more detailed configuration example and the like in each embodiment will be described below.

First Embodiment

"Configuration Example of Correction Device"

Figure 4:
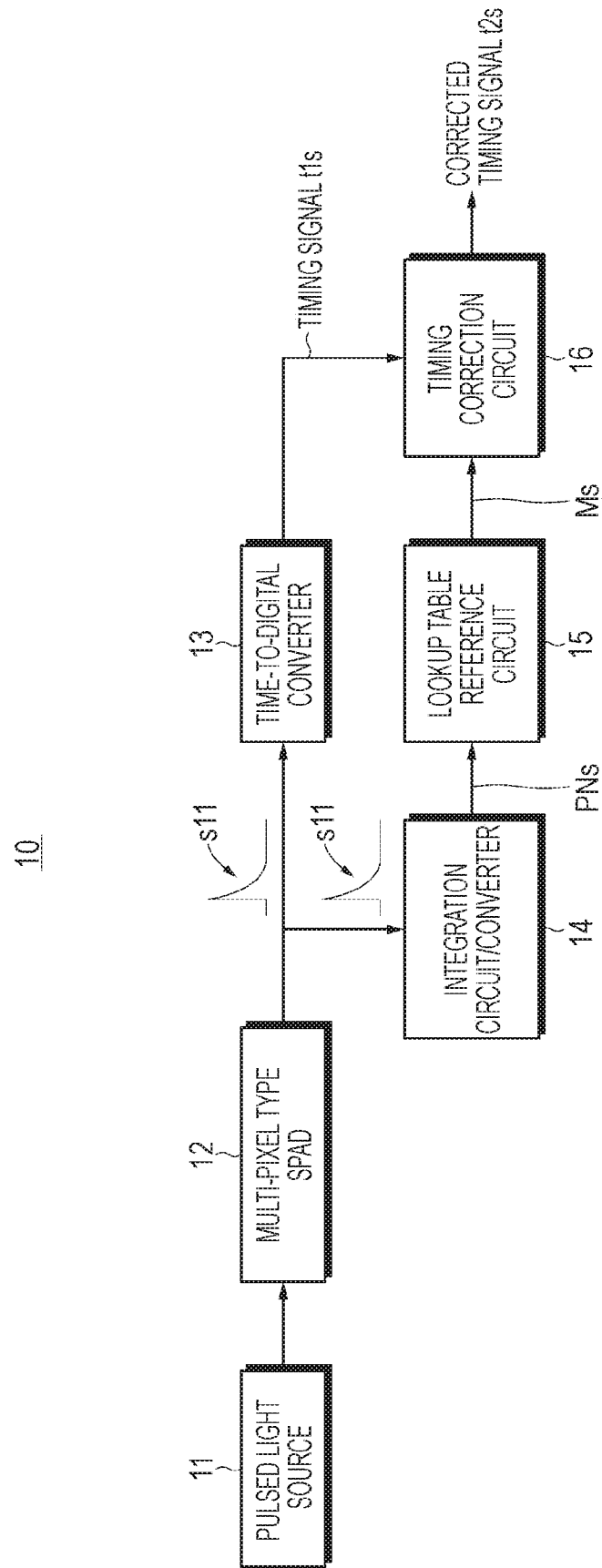
FIG. 4 is a block diagram illustrating a configuration example of a correction device in a first embodiment.

FIG. 4 is a block diagram illustrating a configuration example of a correction device 10 in a first embodiment. The correction device 10 in the first embodiment includes, for example, a pulsed light source 11, a multi-pixel type Single Photon Avalanche Diode (SPAD) (hereinafter appropriately abbreviated as SPAD) 12, a Time-to-Digital converter (TDC) 13, an integration circuit/converter 14, a lookup table reference circuit 15, and a timing correction circuit 16.

The pulsed light source 11 includes, for example, a semiconductor laser as a light source, a driver for driving the semiconductor laser, and the like. For example, pulsed light is emitted from the semiconductor laser at a predetermined period by intermittent operating of the driver.

The SPAD 12 that is an example of the discretized output type photodetector 3 includes a light receiving unit and a drive circuit. The SPAD 12 receives light (hereinafter appropriately referred to as reflected pulsed light RP) that is the pulsed light emitted from the pulsed light source 11 and reflected by the distance measurement target. Along with reception of the reflected pulsed light RP, a signal s11 (hereinafter appropriately referred to as an SPAD output signal) is output from the SPAD 12. The SPAD output signal s11 is output to each of the time-to-digital converter 13 and the integration circuit/converter 14. Note that, a specific configuration example of the SPAD 12 will be described later.

The time-to-digital converter 13 that is an example of the timing measurement circuit 4 is a circuit that measures timing t1 at which a level of the SPAD output signal s11 exceeds a predetermined threshold value Vth. The time-to-digital converter 13 generates a digital format timing signal t1s indicating the timing t1.

The integration circuit/converter 14 that is an example of the photon number counting circuit 5 includes an analog integration circuit and an Analog-to-Digital (AD) converter connected to the subsequent stage of the integration circuit. The integration circuit/converter 14 integrates the SPAD output signal s11 by the integration circuit to acquire an integrated value, and acquires (counts) a photon number PN received by the SPAD 12 from the integrated value.

The lookup table reference circuit 15 that is an example of the shift amount calculation circuit 6 stores a lookup table in which the photon number PN and a shift amount M that is an example of the correction value are associated with each other. The lookup table reference circuit 15 refers to the lookup table to acquire the shift amount M corresponding to the photon number PN supplied from the integration circuit/converter 14, and generates a signal Ms indicating the shift amount M.

The timing correction circuit 16 is a circuit that corrects the timing t1 on the basis of the shift amount M. The timing correction circuit 16 corrects the timing t1 on the basis of the shift amount M to acquire timing t2, and generates a timing signal t2s indicating the timing t2.

"About SPAD"

Figure 5:
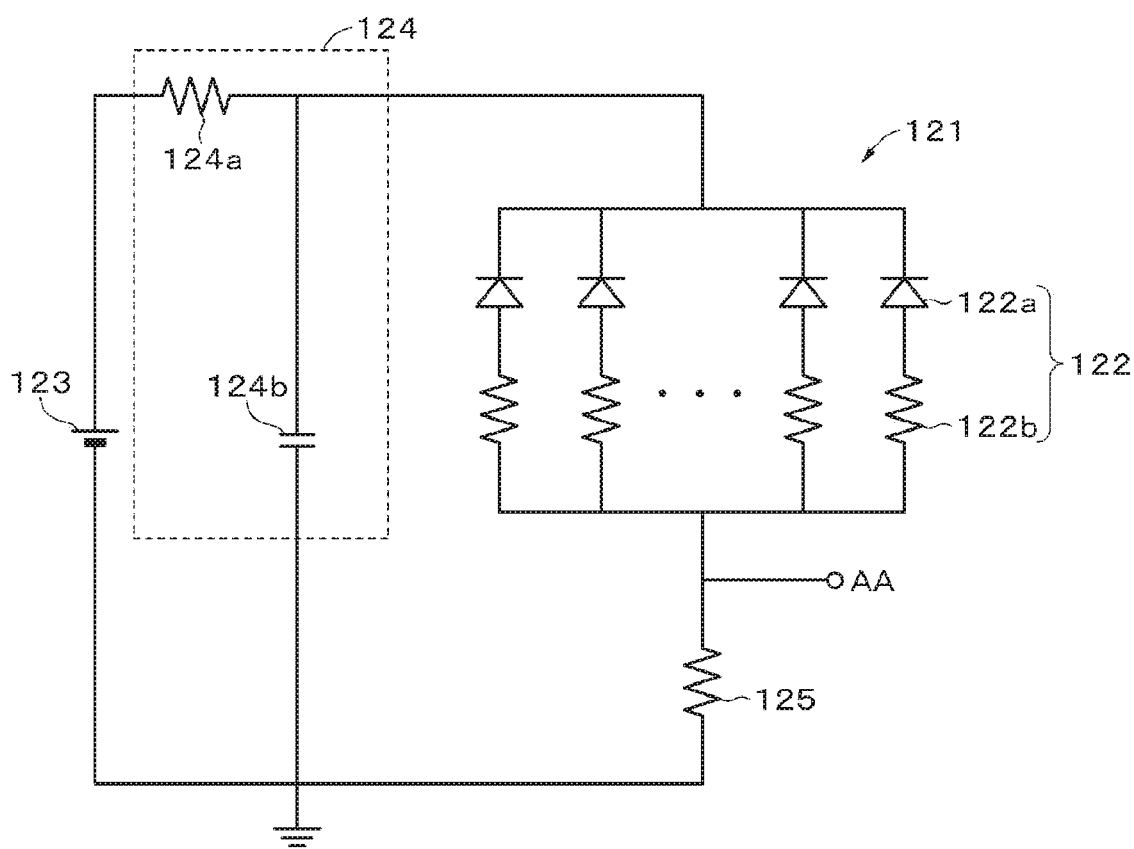
FIG. 5 is a circuit diagram illustrating a configuration example of a multi-pixel type Single Photon Avalanche Diode (SPAD).

Next, details of the SPAD 12 will be described. FIG. 5 illustrates a configuration example of the SPAD 12. The SPAD 12 includes a light receiving unit 121 that actually receives light. The light receiving unit 121 includes a plurality of light receiving elements 122. Each of the light receiving elements 122 includes an avalanche photodiode 122a and a quenching resistor 122b connected in series to the avalanche photodiode 122a. That is, the light receiving unit 121 has a configuration in which one light receiving element 122 is used as a basic unit and the plurality of light receiving elements 122 is electrically connected together two-dimensionally (for example, in parallel).

Further, the SPAD 12 includes a power supply 123 for applying a predetermined voltage to the light receiving unit 121, a smoothing circuit 124 including a resistor 124a and a capacitor 124b for stabilizing a power supply voltage, and a resistor 125 for converting a current signal output from the light receiving unit 121 into a voltage signal. The resistor 125 is connected to the output side of the light receiving unit 121, and the subsequent stage configuration (the time-to-digital converter 13 and the integration circuit/converter 14) is connected to a connection point AA between the light receiving unit 121 and the resistor 125. Through this connection point AA, the SPAD output signal s11 is output to the subsequent stage configuration.

An avalanche phenomenon occurring in the light receiving unit 121 will be described. Note that, for convenience of explanation, one light receiving element 122 will be described as an example, but similar phenomenon also occurs in other light receiving elements. When a photon enters the avalanche photodiode 122a in a state where a reverse voltage equal to or higher than the breakdown voltage is applied, the avalanche photodiode 122a generates an electron-hole pair, and the electron and hole are accelerated by a high electric field, and new electron-hole pairs are generated one after another like an avalanche. This phenomenon is referred to as the avalanche phenomenon.

The avalanche phenomenon can be stopped by lowering the voltage applied to the avalanche photodiode 122a to the breakdown voltage. This function can be realized by the quenching resistor 122b connected in series to the avalanche photodiode 122a. The bias voltage drops due to a voltage increase across terminals of the quenching resistor 122b due to an avalanche current, and the avalanche current stops.

Figure 6:
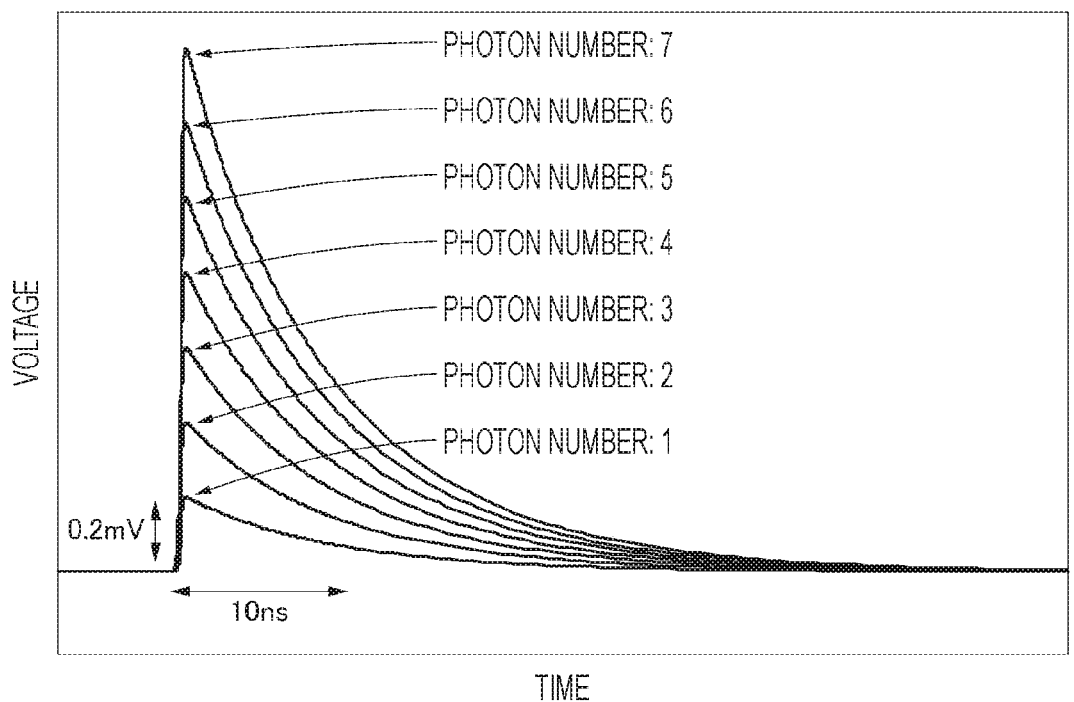
FIG. 6 is a diagram illustrating a waveform example of a multi-pixel type SPAD output signal.

FIG. 6 illustrates an ideal waveform of the SPAD output signal s11 output from the SPAD 12. In FIG. 6, the horizontal axis represents time and the vertical axis represents voltage. In an actual waveform, a pulse-shaped or random noise waveform due to a thermal factor or the like appears on this waveform.

When the photon is received, the SPAD output signal s11 shows a sharp rise, and the level reaches a peak voltage (hereinafter also appropriately referred to as a crest value) and then decreases exponentially. In the SPAD 12 to which a reverse bias voltage equal to or higher than the breakdown voltage is applied, the avalanche photodiode 122a in each of the light receiving elements 122 outputs a current pulse of a waveform and peak voltage determined by one photon at a time, and total current of all the light receiving elements is output from the output terminal of the light receiving unit 121. By passing this signal through the resistor 125, the SPAD output signal s11 can be handled as a voltage signal.

As illustrated in FIG. 6, in accordance with the photon number received by the light receiving unit 121, the integrated value obtained by integrating the crest value and waveform is discretized. In other words, by obtaining the crest value of the SPAD output signal s11, the photon number received by the light receiving unit 121 can be obtained.

Figure 7:
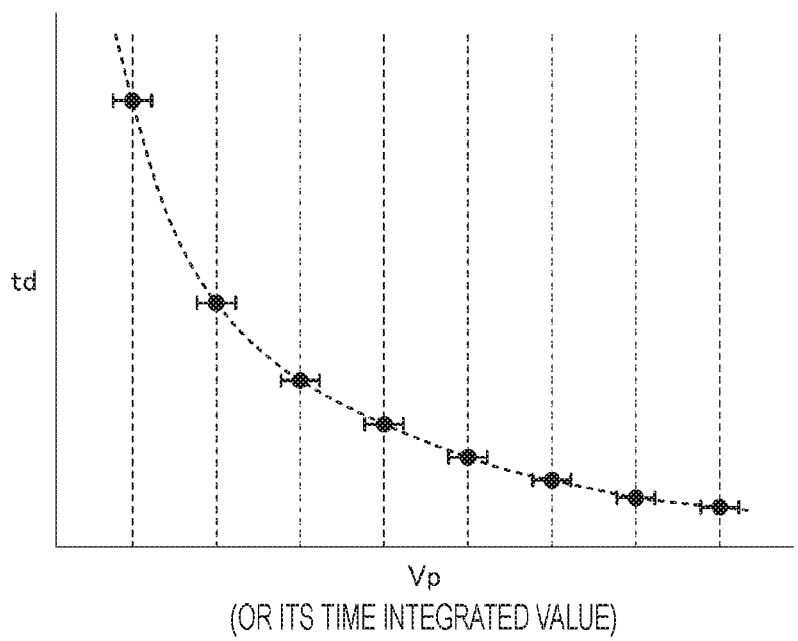
FIG. 7 is a diagram for explaining a relationship between a delay time and a peak voltage of the multi-pixel type SPAD output signal.

FIG. 7 is a diagram schematically illustrating a relationship between a peak voltage Vp of the SPAD output signal s11 and a delay time td (see FIG. 1) from a rise start to detection at the threshold value Vth. In FIG. 7, the horizontal axis represents the peak voltage of the SPAD output signal s11 discretized in accordance with a received photon number, or an integrated value obtained by integrating the voltage of the SPAD output signal s11, and the vertical axis represents the delay time td. In FIG. 7, it is illustrated that the delay time td is also discretized along with the discretization of the output from the SPAD 12. In addition, it is illustrated that a discretization interval of the peak voltage Vp or its time integrated value is constant corresponding to an increment of one detected photon number, and the weaker the signal is, the larger the discretization interval of the delay time td is.

A specific example will be described. The discretization interval of the peak voltage Vp is typically 0.2 to 0.3 millivolts (mV) per photon. The rise time of the SPAD output signal s11 is typically 0.6 ns. For example, in a case where the threshold value is an equivalent of 2.5 photons (to prevent erroneous detection of noise, a signal of 2 photons or less is not detected in the subsequent stage), the delay time td at the time of detecting three photons and the delay time at the time of detecting four photons respectively are 0.5 ns (=0.6 ns*2.5/3) and 0.375 ns (=0.6 ns*2.5/4), and the discretization interval of the delay time td is 0.125 ns, and there is no other delay time td in the meantime.

Figure 8:
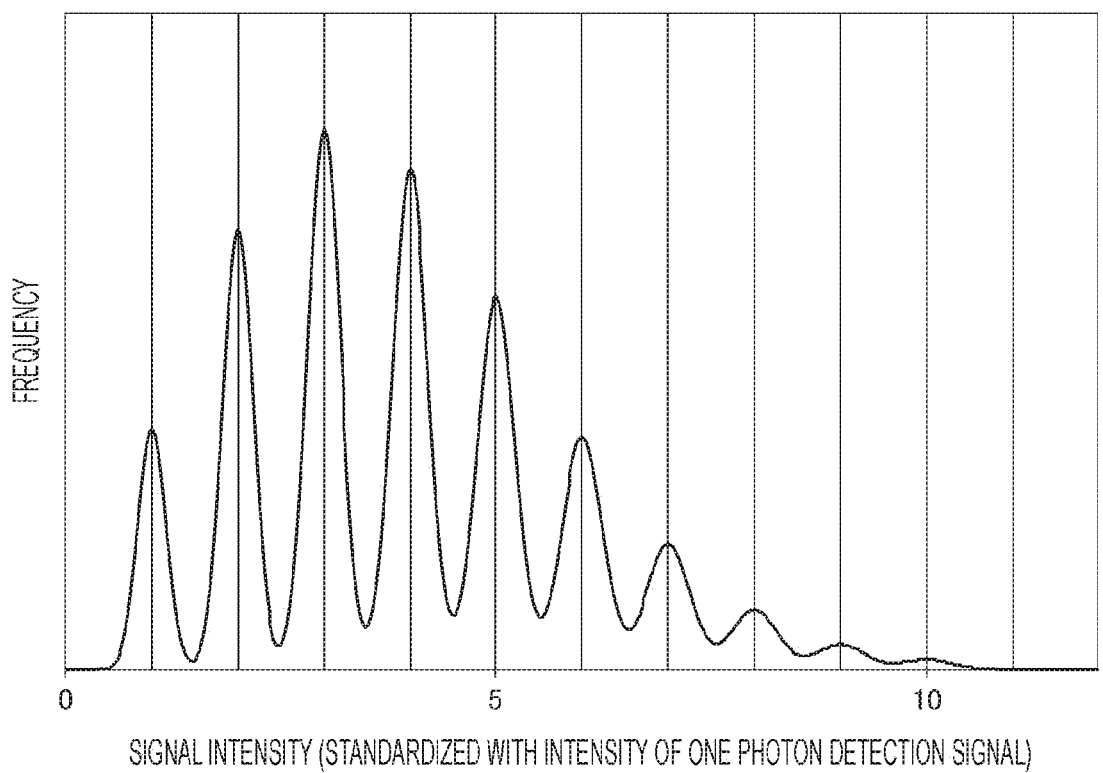
FIG. 8 is a diagram illustrating a measurement example of a frequency distribution of an integrated value for each pulse of the multi-pixel type SPAD output signal.

Actually, the SPAD output signal s11 and the amplified signal thereof include analog noise such as thermal noise, but a high Signal-to-Noise Ratio (S/N) is obtained by a current multiplying function in the light receiving element 122. For this reason, the discretization interval for each detected photon number is larger than a fluctuation range of the signal due to noise, and when a frequency distribution of the pulse peak value or the integrated value of the SPAD output signal s11 is measured, as illustrated in FIG. 8, a histogram is obtained having a maximum value at a value corresponding to the detected photon number.

That is, by using the SPAD 12, a signal with a high S/N can be obtained even in a case where weak light is received. Further, the SPAD output signal s11 output from the SPAD 12 can be handled as a signal discretized in accordance with the peak voltage or the like. Then, it is possible to use a circuit for detecting the peak voltage or integrated value of the SPAD output signal s11, to count the detected photon number in integer units from an output of the circuit, and to output a digital signal corresponding to the detected photon number.

"Operation of Correction Device"

Next, an operation example will be described of the correction device 10 in the first embodiment. The pulsed light emitted from the pulsed light source 11 is reflected by the distance measurement target, and is input as the reflected pulsed light RP by the SPAD 12. Along with reception of the reflected pulsed light RP, the SPAD output signal s11 is output from the SPAD 12. The SPAD output signal s11 is input to the time-to-digital converter 13. The time-to-digital converter 13 measures the timing t1 at which a voltage level of the SPAD output signal s11 exceeds the threshold value Vth, and outputs the timing signal t1s indicating the timing t1 to the timing correction circuit 16.

Meanwhile, the SPAD output signal s11 output from the SPAD 12 is also input to the integration circuit/converter 14. The integration circuit/converter 14 integrates the SPAD output signal s11 by the integration circuit to obtain an integrated value, and obtains the photon number PN on the basis of the integrated value. Then, the integration circuit/converter 14 uses the AD converter to generate a digital format photon number signal PNs indicating the photon number PN, and outputs the signal to the lookup table reference circuit 15.

Figure 9:
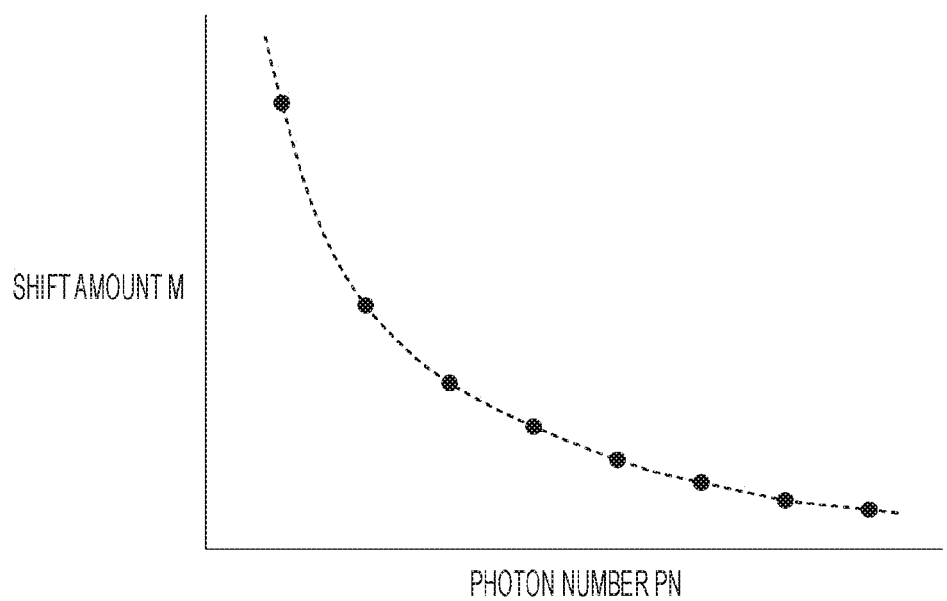
FIG. 9 is a diagram for explaining a relationship between a photon number and a shift amount.

The lookup table reference circuit 15 refers to the lookup table to acquire the shift amount M corresponding to the photon number PN. In the lookup table to be referred to, as schematically illustrated in FIG. 9, a correspondence between the photon number PN and the shift amount M is described already, so that the lookup table reference circuit 15 can acquire the shift amount M corresponding the photon number PN. The lookup table reference circuit 15 outputs the signal Ms indicating the shift amount M to the timing correction circuit 16. The timing correction circuit 16 corrects the timing t1 on the basis of the shift amount M to acquire corrected timing t2, and outputs the timing signal t2s indicating the timing t2.

According to the first embodiment as described above, even in a case where the light received is weak (for example, the photon number is tens or less), the walk error caused by the difference in light intensity can be corrected with high accuracy. In addition, the photon number obtained from the integrated value obtained by integrating the SPAD output signal s11 is converted into a digital value, so that superimposition can be prevented of the noise and error due to the subsequent stage circuit or the like from the integration circuit/converter 14.

Modification of First Embodiment

The first embodiment described above can be modified as follows. For example, in the integration circuit/converter 14, an analog peak hold circuit may be used instead of the integration circuit. In addition, in the integration circuit/converter 14, by matching a quantization interval of the AD converter with a discretization interval of an output of the integration circuit (or the peak hold circuit), it is possible to reduce a circuit scale of the AD converter while maintaining the counting accuracy of the photon number.

In a case where the peak voltage of the SPAD output signal s11 is high (in a region where the pulse height is high), the discretization interval of the delay time td decreases, so that it is possible to extend the interval of the detected photon number in accordance with required correction accuracy. This makes it possible to reduce bit depth of correction data (total number of data points) as compared with the case of using the photodiode or the linear mode avalanche photodiode, and it is possible to correct the walk error with low cost and with high accuracy.

Second Embodiment

Next, a second embodiment will be described. Note that, in the following description, the same name and reference numeral designate the same or equivalent member unless otherwise specified, and redundant explanation will be appropriately omitted. In addition, the matters described in the first embodiment can be applied to the second embodiment unless otherwise specified.

"Configuration Example of Distance Measuring Device"

Figure 10:
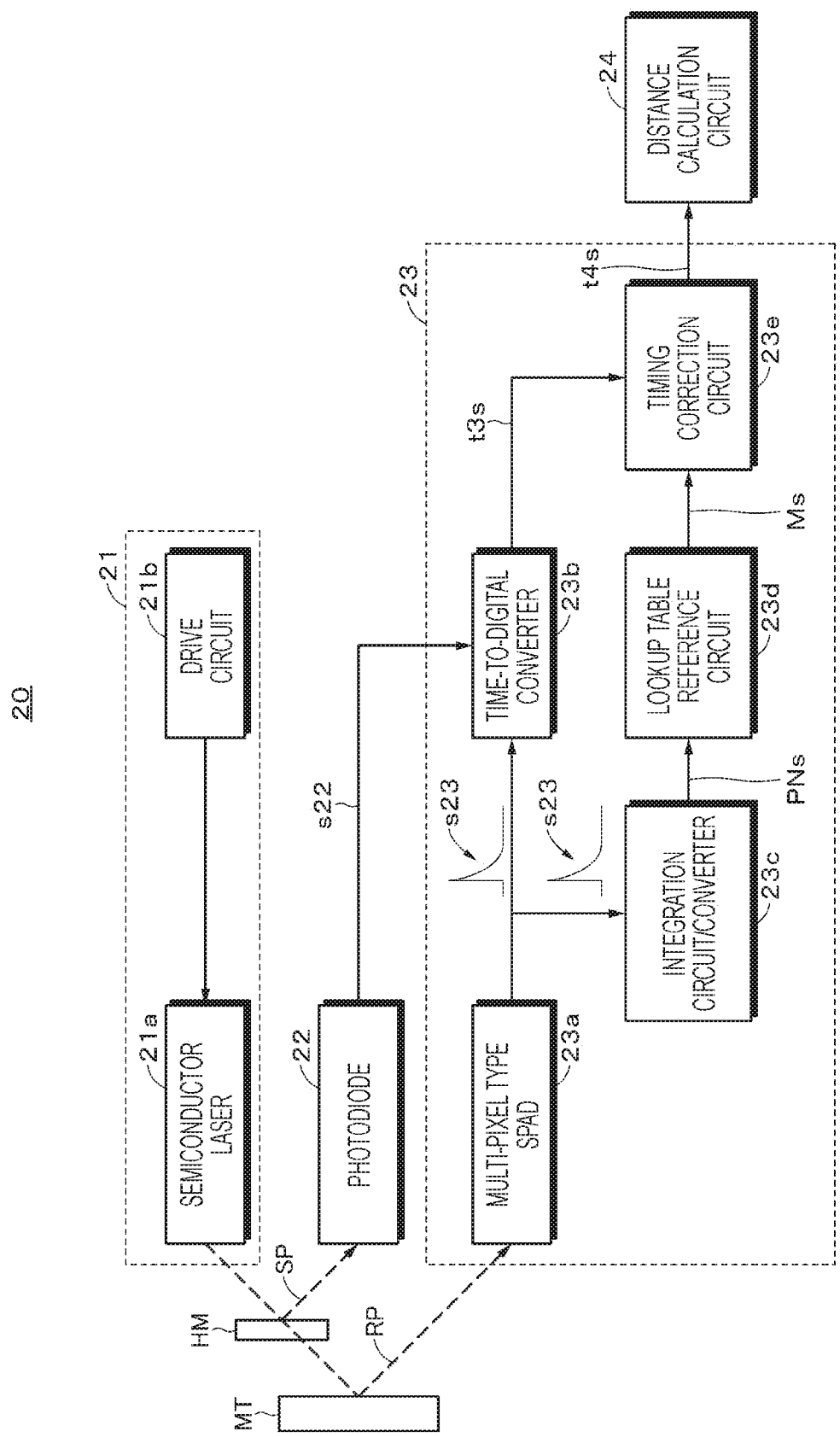
FIG. 10 is a block diagram illustrating a configuration example of a distance measuring device in a second embodiment.

The second embodiment is an example in which the correction device according to the present disclosure is applied to a distance measuring device. FIG. 10 is a block diagram illustrating a configuration example of a distance measuring device 20 in the second embodiment. The distance measuring device 20 includes, for example, a pulsed light source 21, a photodiode 22, a correction device 23 in the second embodiment, and a distance calculation circuit 24.

The pulsed light source 21 includes, for example, a semiconductor laser 21a and a drive circuit 21b. For example, the drive circuit 21b operates intermittently at a predetermined period, and thus, laser pulsed light is intermittently emitted from the semiconductor laser 21a. Note that, a part of the pulsed light emitted from the semiconductor laser 21a is branched by a half mirror HM and input as reference pulsed light SP to the photodiode 22, and the remainder is emitted to and reflected by a distance measurement target MT, and then is input as reflected pulsed light RP to the correction device 23.

The photodiode 22 outputs a light receiving signal s22 along with reception of the reference pulsed light SP. The light receiving signal s22 is amplified by an amplifier (not illustrated) and then is input to a time-to-digital converter 23b.

The correction device 23 includes, for example, a (multi-pixel type) SPAD 23a, the time-to-digital converter 23b, an integration circuit/converter 23c, a lookup table reference circuit 23d, and a timing correction circuit 23e. The configuration and the like of the correction device 23 are similar to those of the correction device 10 in the first embodiment, except that the pulsed light source 11 is not included.

The distance calculation circuit 24 is a circuit that calculates a distance to the distance measurement target MT by calculation. For example, the distance calculation circuit 24 multiplies a time difference signal t4s supplied from the timing correction circuit 23e by the speed of light to obtain a round-trip distance, and divides the round-trip distance by two to calculate the distance to the distance measurement target MT.

"Operation Example of Distance Measuring Device"

Next, an operation example will be described of the distance measuring device 20. The pulsed light is emitted from the pulsed light source 21, and light branched by the half mirror HM is input as the reference pulsed light SP to the photodiode 22. When the photodiode 22 receives the reference pulsed light SP, the light receiving signal s22 is output from the photodiode 22. The light receiving signal s22 is subjected to processing such as amplification by the amplifier (not illustrated), and then is input to the time-to-digital converter 23b. The time-to-digital converter 23b acquires timing t22 at which the photodiode 22 receives the reference pulsed light SP by the leading edge detection method.

Meanwhile, light reflected by the distance measurement target MT is input as the reflected pulsed light RP to the SPAD 23a of the correction device 23. When the SPAD 23a receives the reflected pulsed light RP, an SPAD output signal s23 is output from the SPAD 23a. The SPAD output signal s23 is input to the time-to-digital converter 23b. The time-to-digital converter 23b acquires timing t23 at which SPAD 23a receives the reflected pulsed light RP by the leading edge detection method. Then, the time-to-digital converter 23b acquires a time difference signal t3s (=t23−t22) that is a time difference between the timings t22 and t23. This time difference signal t3s corresponds to time of flight (here, uncorrected time of flight) of the pulsed light emitted from the semiconductor laser 21a.

Meanwhile, the SPAD output signal s23 output from the SPAD 23a is also input to the integration circuit/converter 23c. The integration circuit/converter 23c integrates the SPAD output signal s23 by the integration circuit to obtain an integrated value, and obtains a photon number PN on the basis of the integrated value. Then, the integration circuit/converter 23c uses the AD converter to generate a digital format photon number signal PNs indicating the photon number PN, and outputs the signal to the lookup table reference circuit 23d.

The lookup table reference circuit 23d refers to a lookup table to acquire a shift amount M corresponding to the photon number PN. The lookup table reference circuit 23d outputs a signal Ms indicating the shift amount M to the timing correction circuit 23e. The timing correction circuit 23e corrects the time difference signal t3s on the basis of the shift amount M. For example, the timing correction circuit 23e subtracts the shift amount M from the time difference signal t3s to perform correction, and acquires the time difference signal t4s corresponding to accurate time of flight of the pulsed light. Then, the timing correction circuit 23e outputs the time difference signal t4s to the distance calculation circuit 24.

The distance calculation circuit 24 multiplies the time difference signal t4s by the speed of light, and divides the result by two to calculate the distance to the distance measurement target MT. As described above, the correction device of the present disclosure can also be applied to the distance measuring device.

Modification of Second Embodiment

The second embodiment described above can be modified as follows. Light intensity of the reference pulsed light SP received by the photodiode 22 is generally large (for example, 100 or more photons). Therefore, although necessity is low to use a specific light receiving element, a continuous mode avalanche photodiode or SPAD may be used instead of the photodiode 22. By using a device with higher sensitivity, it is possible to decrease an amount of light branched by the half mirror HM and increase the amount of light to be emitted to the distance measurement target. In addition, the modification described in the first embodiment can be applied to the second embodiment.

Third Embodiment

Next, a third embodiment will be described. Note that, in the following description, the same name and reference numeral designate the same or equivalent member unless otherwise specified, and redundant explanation will be appropriately omitted. In addition, the matters described in the first and second embodiments can be applied to the third embodiment unless otherwise specified.

"Configuration Example of Distance Measuring Device"

Figure 11:
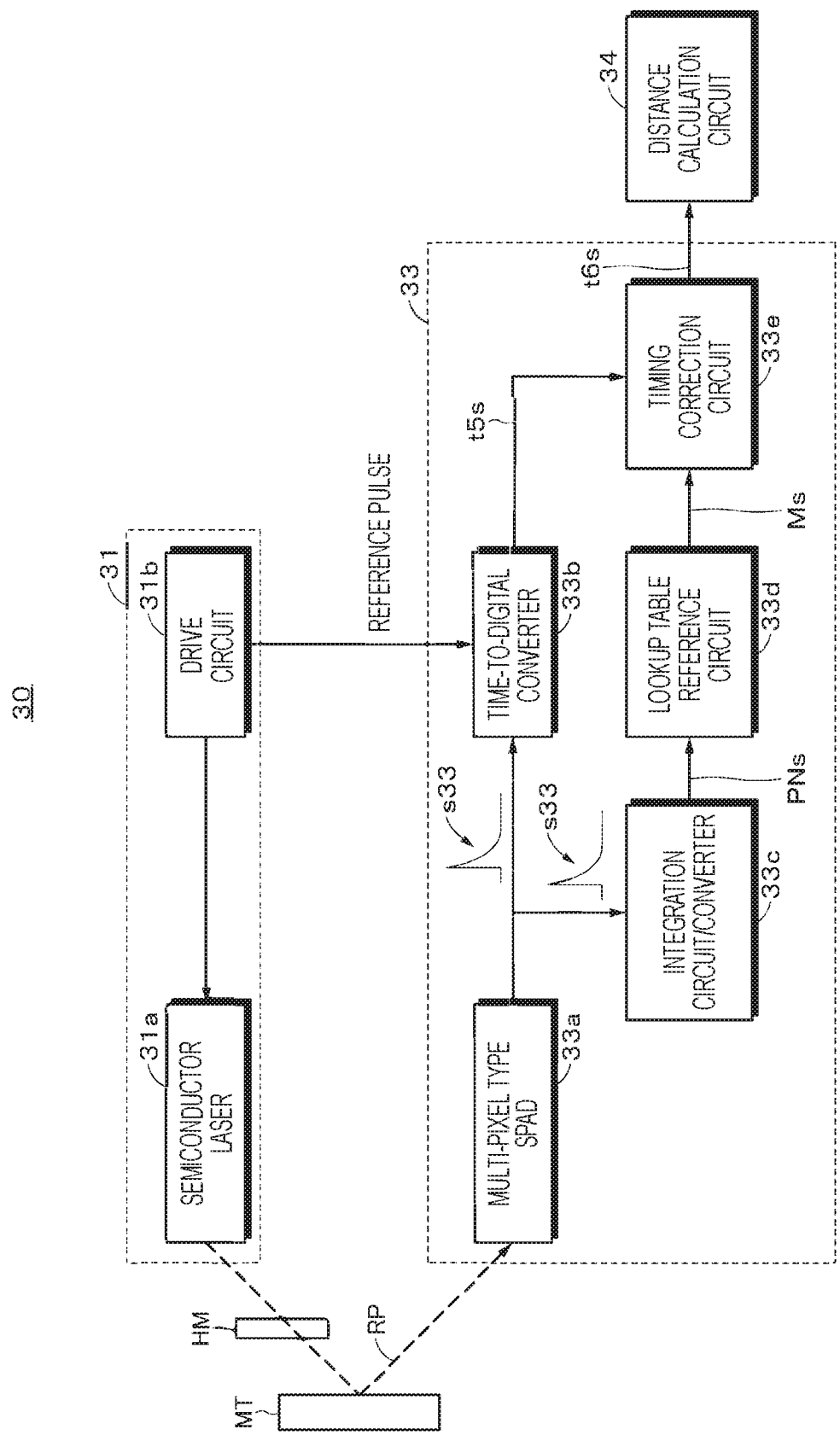
FIG. 11 is a block diagram illustrating a configuration example of a distance measuring device in a third embodiment.

The third embodiment is an example in which the correction device according to the present disclosure is applied to a distance measuring device, similar to the second embodiment. FIG. 11 is a block diagram illustrating a configuration example of a distance measuring device 30 in the second embodiment. The distance measuring device 30 includes, for example, a pulsed light source 31, a correction device 33 in the third embodiment, and a distance calculation circuit 34.

The pulsed light source 31 includes, for example, a semiconductor laser 31a and a drive circuit 31b. For example, the drive circuit 31b operates at a predetermined period, and thus, the laser pulsed light is intermittently emitted from the semiconductor laser 31a. Note that, the pulsed light emitted from the semiconductor laser 31a is emitted to and reflected by a distance measurement target MT, and then is input as reflected pulsed light RP to the correction device 33.

The correction device 33 includes, for example, a (multi-pixel type) SPAD 33a, a time-to-digital converter 33b, an integration circuit/converter 33c, a lookup table reference circuit 33d, and a timing correction circuit 33e. The configuration and the like of the correction device 33 are similar to those of the correction device 23 in the second embodiment.

Similar to the distance calculation circuit 24, the distance calculation circuit 34 is a circuit that calculates a distance to the distance measurement target MT by calculation. For example, the distance calculation circuit 34 multiplies a time difference signal t6s supplied from the timing correction circuit 33e by the speed of light to obtain a round-trip distance, and divides the round-trip distance by two to calculate the distance to the distance measurement target MT.

"Operation Example of Distance Measuring Device"

The distance measuring device 30 extracts a pulse signal synchronized with drive timing from the drive circuit 31b, instead of the photodiode 22 in the second embodiment, and uses the pulse signal as a reference signal for light emission timing detection (hereinafter appropriately referred to as a reference pulse). Hereinafter, a specific operation example will be described of the distance measuring device 30.

Along with operation of the drive circuit 31b, the pulsed light is emitted from the pulsed light source 31. In addition, a reference pulse is output in synchronization with the drive timing of the drive circuit 31b, and the reference pulse is input from the drive circuit 31b to the time-to-digital converter 33b of the correction device 33. The time-to-digital converter 33b stores timing t31 at which the reference pulse is input.

The pulsed light emitted from the pulsed light source 31 is reflected by the distance measurement target MT and is input as the reflected pulsed light RP to the SPAD 33a of the correction device 33. When the SPAD 33a receives the reflected pulsed light RP, an SPAD output signal s33 is output from the SPAD 33a. The SPAD output signal s33 is input to the time-to-digital converter 33b. The time-to-digital converter 33b acquires timing t33 at which the SPAD 33a receives the reflected pulsed light RP by the leading edge detection method. Then, the time-to-digital converter 33b acquires a time difference signal t5s (=t33−t31) that is a time difference between the timing t31 stored and the timing t33. Note that, the time difference signal t5s corresponds to time of flight (here, uncorrected time of flight) of the pulsed light emitted from the semiconductor laser 31a.

Meanwhile, the SPAD output signal s33 output from the SPAD 33a is also input to the integration circuit/converter 33c. The integration circuit/converter 33c integrates the SPAD output signal s33 by the integration circuit to obtain an integrated value, and obtains the photon number PN on the basis of the integrated value. Then, the integration circuit/converter 33c uses the AD converter to generate a digital format photon number signal PNs indicating the photon number PN, and outputs the signal to the lookup table reference circuit 33d.

The lookup table reference circuit 33d refers to a lookup table to acquire a shift amount M corresponding to the photon number PN. The lookup table reference circuit 33d outputs a signal Ms indicating the shift amount M to the timing correction circuit 33e. The timing correction circuit 33e corrects the time difference signal t5s on the basis of the shift amount M. For example, the timing correction circuit 33e subtracts the shift amount M from the time difference signal t5s to perform correction, and acquires the time difference signal t6s corresponding to accurate time of flight of the pulsed light. Then, the timing correction circuit 33e outputs the time difference signal t6s to the distance calculation circuit 34.

The distance calculation circuit 34 multiplies the time difference signal t6s by the speed of light, and divides the result by two to calculate the distance to the distance measurement target MT. As described above, the correction device of the present disclosure can also be applied to the distance measuring device. Further, according to the third embodiment, the photodiode and the half mirror for light branching can be omitted, so that the optical system can be simplified and the distance measuring device can be downsized. Note that, the modifications described in the first and second embodiments can also be applied to the third embodiment.

Fourth Embodiment

Next, a fourth embodiment will be described. Note that, in the following description, the same name and reference numeral designate the same or equivalent member unless otherwise specified, and redundant explanation will be appropriately omitted. In addition, the matters described in the first to third embodiments can be applied to the fourth embodiment unless otherwise specified.

Figure 12:
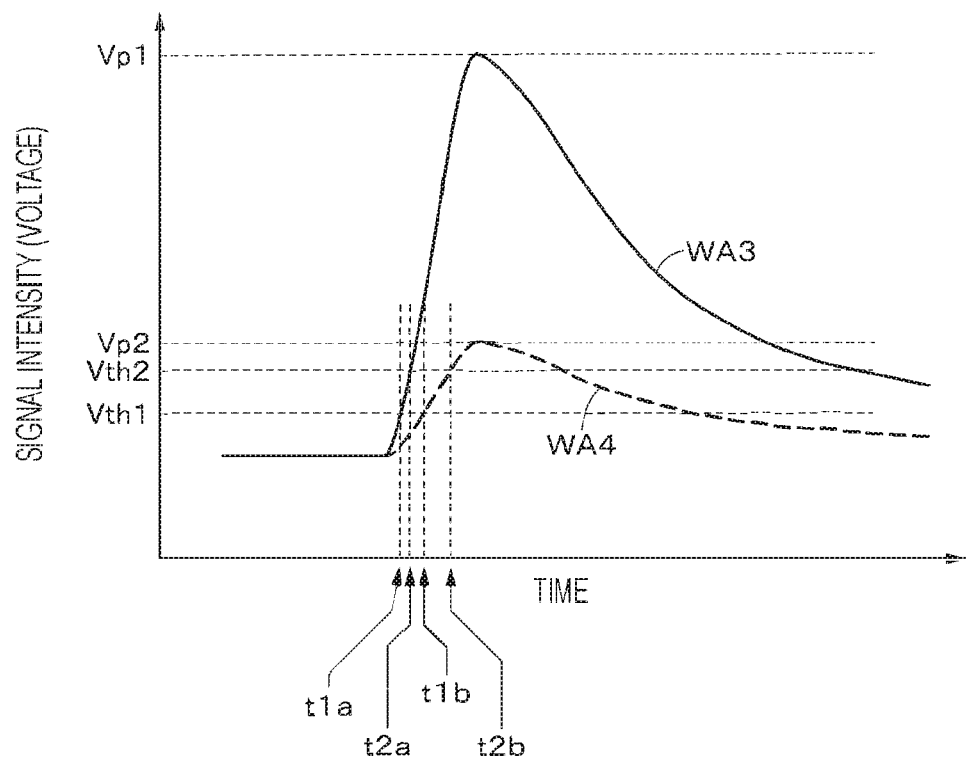
FIG. 12 is a diagram for explaining how a time difference varies between timings detected with different threshold values in accordance with strength of pulse intensity.

In the fourth embodiment, a plurality of different threshold values is set for pulsed light to detect a photon number. This point will be described with reference to FIGS. 12 and 13. In FIG. 12, the horizontal axis represents time and the vertical axis represents signal intensity (voltage level) of pulsed light (for example, reflected pulsed light RP). In FIG. 12, waveforms WA3 and WA4 of two pulsed lights are illustrated, and peak voltages of the respective pulsed lights are Vp1 and Vp2 (here, Vp1>Vp2). That is, light intensity of the pulsed light indicated by the waveform WA3 is larger than light intensity of the pulsed light indicated by the waveform WA4.

As illustrated in FIG. 12, two threshold values Vth1 and Vth2 (here, Vth2>Vth1) are set as voltage threshold values. Here, timing at which a voltage level of the waveform WA3 exceeds the threshold value Vth1 is timing t1a, timing at which the voltage level exceeds the threshold value Vth2 is timing t2a, and a difference between the timings (t2a–t1a) is Δt1. Meanwhile, timing at which a voltage level of the waveform WA4 exceeds the threshold value Vth1 is timing t1b, timing at which the voltage level exceeds the threshold value Vth2 is timing t2b, and a difference between the timings (t2b–t1b) is set to Δt2. Note that, Δt1 or Δt2 is appropriately referred to as a detection time difference in the following description. In a case where the light intensity of the pulsed light is weak, the difference is large between the timings at which the respective threshold values Vth1 and Vth2 are reached. For example, Δt2 is larger than Δt1.

Figure 13:
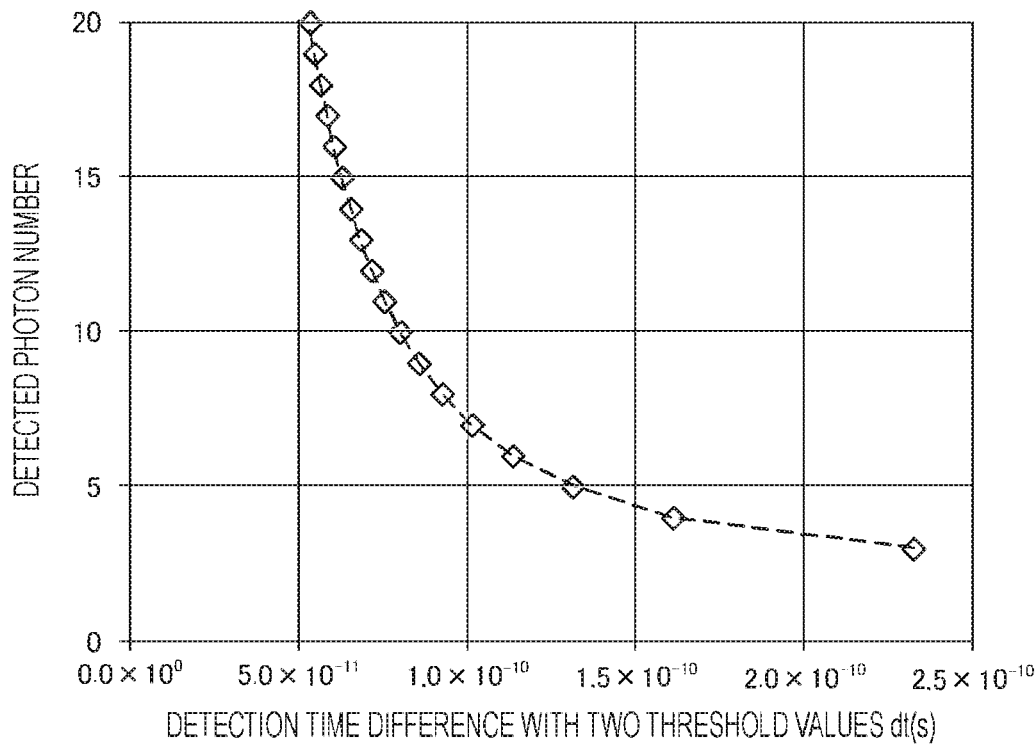
FIG. 13 is a diagram illustrating an example of a lookup table describing a relationship between a detection time difference between timings detected with different threshold values and a detected photon number.

Utilizing this feature, by preparing a lookup table in which a detected photon number corresponding to the detection time difference is described, the photon number contained in the pulsed light can be acquired in accordance with the detection time difference. FIG. 13 illustrates an example of the lookup table in which the photon number corresponding to the detection time difference is described. As illustrated in FIG. 13, in the lookup table, a relationship is described in which the corresponding photon number decreases as the detection time difference increases. Note that, in an actual circuit, noise may appear on a timing measurement value, but by rounding the value to the nearest theoretical value, the photon number in integer units can be obtained.

"Configuration Example of Distance Measuring Device"

Figure 14:
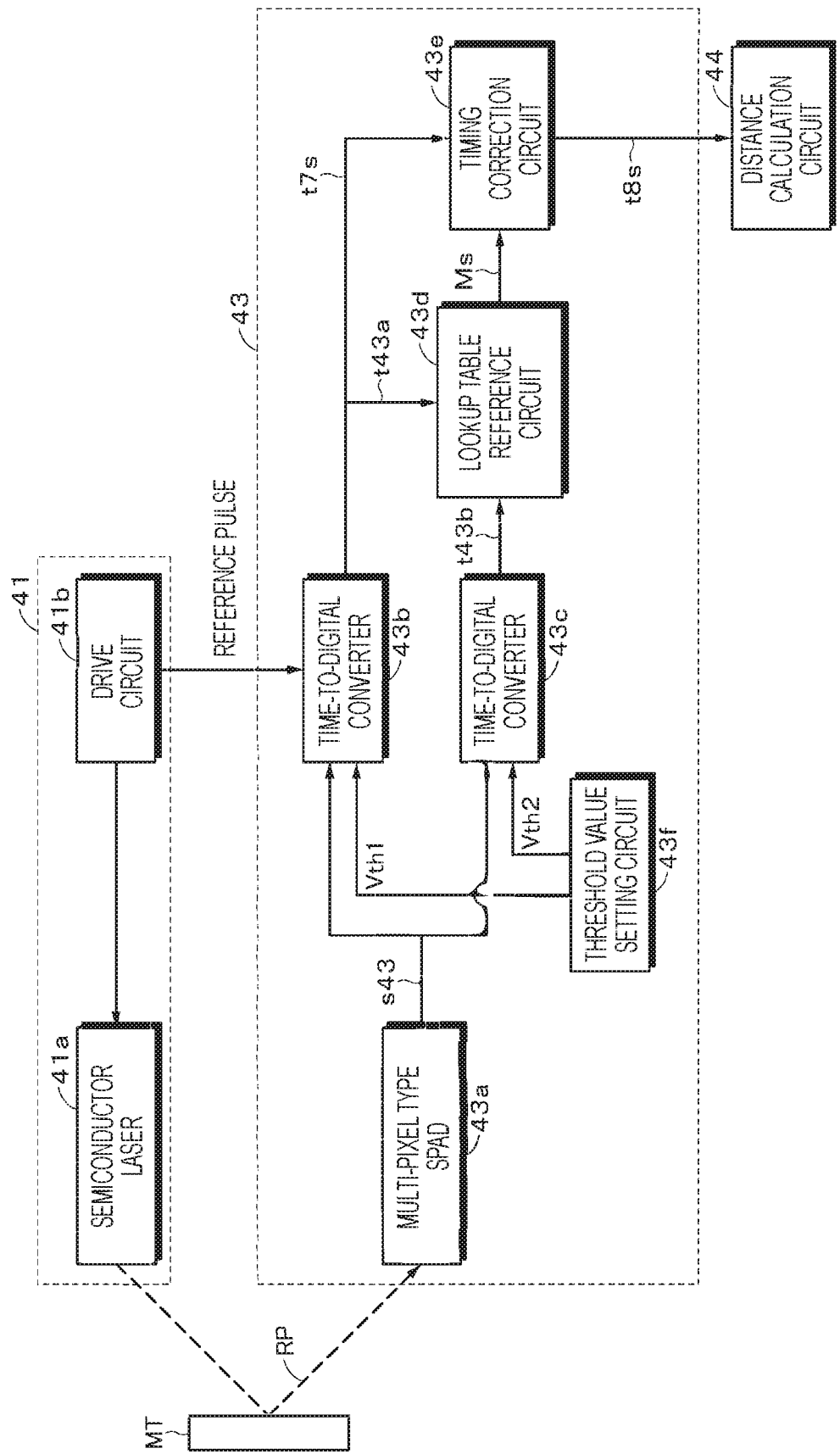
FIG. 14 is a block diagram illustrating a configuration example of a distance measuring device in a fourth embodiment.

Next, a distance measuring device will be described to which the correction device in the fourth embodiment of the present disclosure is applied. FIG. 14 is a block diagram illustrating a configuration example of a distance measuring device 40 in the fourth embodiment. The distance measuring device 40 includes, for example, a pulsed light source 41, a correction device 43 in the fourth embodiment, and a distance calculation circuit 44.

The pulsed light source 41 includes, for example, a semiconductor laser 41a and a drive circuit 41b. For example, the drive circuit 41b operates at a predetermined period, and thus, the laser pulsed light is intermittently emitted from the semiconductor laser 41a. Note that, the pulsed light emitted from the semiconductor laser 41a is emitted to and reflected by a distance measurement target MT, and then is input as the reflected pulsed light RP to the correction device 43.

The correction device 43 includes, for example, a (multi-pixel type) SPAD 43a, a first time-to-digital converter 43b, a second time-to-digital converter 43c, a lookup table reference circuit 43d, a timing correction circuit 43e, and a threshold value setting circuit 43f.

The distance calculation circuit 44 is a circuit that calculates a distance to the distance measurement target MT by calculation. For example, the distance calculation circuit 44 multiplies a time difference signal t8s supplied from the timing correction circuit 43e by the speed of light to obtain a round-trip distance, and divides the round-trip distance by two to calculate the distance to the distance measurement target MT.

A configuration example of the correction device 43 will be described. The SPAD 43a receives the reflected pulsed light RP reflected by the distance measurement target MT. Along with reception of the reflected pulsed light RP, an SPAD output signal s43 is output from the SPAD 43a, and the SPAD output signal s43 is input to each of the time-to-digital converters 43b and 43c.

The time-to-digital converter 43b measures timing t43a at which a level of the SPAD output signal s43 exceeds the threshold value Vth1. A reference pulse synchronized with drive timing of the drive circuit 41b is input to the time-to-digital converter 43b.

The time-to-digital converter 43c measures timing t43b at which the level of the SPAD output signal s43 exceeds the threshold value Vth2.

The lookup table reference circuit 43d is a circuit that refers to the lookup table to obtain the photon number on the basis of a difference between the timing t43a and the timing t43b. In the lookup table to which the lookup table reference circuit 43d refers, the photon number corresponding to the detection time difference is described. In addition, the lookup table reference circuit 43d also stores a lookup table in which the photon number and shift amount are described.

The timing correction circuit 43e is a circuit that corrects timing on the basis of the photon number and then outputs a corrected time difference signal t8s to the distance calculation circuit 44.

"Operation Example of Distance Measuring Device"

Next, an operation example will be described of the distance measuring device 40. Along with operation of the drive circuit 41b, the pulsed light is emitted from the pulsed light source 41. A reference pulse is output in synchronization with the drive timing of the drive circuit 41b, and the reference pulse is input from the drive circuit 41b to the time-to-digital converter 43b of the correction device 43. The time-to-digital converter 43b stores the timing t41 at which the reference pulse is input.

The pulsed light emitted from the pulsed light source 41 is reflected by the distance measurement target MT and is input as the reflected pulsed light RP to the SPAD 43a of the correction device 43. When the SPAD 43a receives the reflected pulsed light RP, the SPAD output signal s43 is output from the SPAD 43a. The SPAD output signal s43 is input to each of the time-to-digital converters 43b and 43c. Note that, the threshold values Vth1 and Vth2 are input from the threshold value setting circuit 43f to the time-to-digital converters 43b and 43c, respectively.

The time-to-digital converter 43b acquires the timing t43a at which the SPAD output signal s43 exceeds the threshold value Vth1. Then, the time-to-digital converter 43b generates a digital format timing signal indicating the timing t43a, and outputs the timing signal to the lookup table reference circuit 43d. Further, the time-to-digital converter 43b acquires a time difference signal t7s (=t43−t41) that is a time difference between the timing t41 stored and the timing t43, and supplies the time difference signal t7s to the timing correction circuit 43e.

The time-to-digital converter 43c acquires the timing t43b at which the SPAD output signal s43 exceeds the threshold value Vth2. Then, the time-to-digital converter 43b generates a digital format timing signal indicating the timing t43b, and outputs the timing signal to the lookup table reference circuit 43d.

The lookup table reference circuit 43d obtains the detection time difference that is a difference between the timing t43a and the timing t43b (t43b−t43a), and refers to the lookup table and acquires a photon number PN corresponding to the detection time difference. Then, the lookup table reference circuit 43d refers to the same or different lookup table to acquire a shift amount M corresponding to the photon number PN similarly to the case in the second embodiment and the like. The lookup table reference circuit 43d outputs a signal Ms indicating the shift amount M to the timing correction circuit 43e. The timing correction circuit 43e corrects the time difference signal t7s on the basis of the shift amount M. For example, the timing correction circuit 43e subtracts the shift amount M from the time difference signal t7s to perform correction, and acquires the time difference signal t8s corresponding to accurate time of flight of the pulsed light. Then, the timing correction circuit 43e outputs the time difference signal t8s to the distance calculation circuit 44.

The distance calculation circuit 44 multiplies the time difference signal t8s by the speed of light, and divides the result by two to calculate the distance to the distance measurement target MT. According to the fourth embodiment, it is possible to acquire the photon number of the pulsed light without using an integration circuit or a peak hold circuit.

<Modifications>

The plurality of embodiments of the present disclosure has been specifically described above, but the contents of the present disclosure are not limited to the above-described embodiments, and various modifications can be made based on the technical idea of the present disclosure. Hereinafter, the modifications will be described.

In the embodiments described above, the SPAD is used as an example of the discretized output type photodetector 3, but it is not limited thereto. For example, an element may be used that can discretize and grasp the output. In addition, the configuration of the SPAD (the connection mode of the light receiving element 122, the number of connections, and the like) can be appropriately changed. The quenching resistor 122b is not limited to a resistor but may be another circuit element such as a transistor.

The timing measurement circuit 4 is not limited to the time-to-digital converter. For example, a Constant Fraction Discriminator (CFD) may be used that adds an attenuation waveform of a predetermined waveform and a waveform obtained by delay-inverting the predetermined waveform together to detect a zero-crossing point.

The shift amount calculation circuit 6 is not limited to a lookup table reference circuit, but may be a circuit or the like that obtains a shift amount from the photon number by predetermined calculation processing.

The above-described correction device or distance measuring device is not required to have all the configurations described, and any configuration may be added or deleted, or the function of one component can be integrated into the function of another component. For example, the correction device does not have to include the pulsed light source and SPAD, or may include the distance calculation circuit. In addition, the distance measuring device does not have to include the pulsed light source or SPAD. Further, the correction device and the distance measuring device may additionally include an amplification circuit or the like for amplifying the SPAD output signal.

In the second embodiment and the like described above, the time of flight of the reflected pulsed light RP is corrected on the basis of the shift amount M; however, the timing at which the SPAD 12 receives the reflected pulsed light RP (the timing at which the level of the reflected pulsed light RP exceeds the threshold value) may be corrected on the basis of the shift amount M. Then, by obtaining the difference between the corrected timing and the light emission timing, the time of flight of the reflected pulsed light RP may be obtained.

In the fourth embodiment described above, the threshold value setting circuit 43f may be omitted if the threshold values Vth1 and Vth2 are preset in the time-to-digital converters 43b and 43c, respectively. In addition, the correction device 43 is not necessarily incorporated in the distance measuring device 40 and used.

In each of the above-described embodiments, the electrical connection relationship between the configurations may be a wired connection using a cable or the like, or may be a wireless communication based on a predetermined communication standard.

In addition to the distance measuring device, the correction device of the present disclosure can also be applied to devices in which the distance measuring device is incorporated, (for example: various electronic devices such as a projector device, a game device, an imaging device; a safety device that detects a distance to a pedestrian, an obstacle, or the like to operate a brake in accordance with the distance; a movable body in which such a safety device can be used, such as an automobile, train, airplane, helicopter, or miniature aircraft; a robot; and a security device). In addition, not limited to the distance measuring device, the present disclosure can also be applied to a device requiring accurate detection of the photon number.

In the present disclosure, for example, the configurations, methods, processes, shapes, materials, numerical values, and the like mentioned in the above embodiments are merely examples, and different configurations, methods, processes, shapes, materials, and numerical values may be used. In addition, the present disclosure can be realized by a device, a method, a system including a plurality of devices, and the like, and the matters described in the plurality of embodiments and the modifications can be combined with each other as long as technical inconsistency does not occur.

Note that, the present disclosure can also adopt the following configurations.

(1)

A correction device including:

a photon number counting unit that counts a photon number on the basis of an output signal output from a light receiving unit;

a correction value acquiring unit that acquires a correction value corresponding to the photon number; and a correction unit that performs correction based on the correction value.

(2)

The correction device according to (1), in which the photon number counting unit includes an integration circuit that integrates the output signal, and is configured to count the photon number in accordance with an integrated value by the integration circuit.

(3)

The correction device according to (1), in which the photon number counting unit is configured to count the photon number in accordance with a time difference between a first timing at which a level of the output signal exceeds a first threshold value and a second timing at which the level of the output signal exceeds a second threshold value.

(4)

The correction device according to any one of (1) to (3), in which the photon number counting unit is configured to output a digital format photon number signal indicating the photon number to the correction value acquiring unit.

(5)

The correction device according to any one of (1) to (4), in which the correction value acquiring unit includes a lookup table in which a correction value corresponding to the photon number is described, and is configured to refer to the lookup table to acquire the correction value corresponding to the photon number.

(6)

The correction device according to any one of (1) to (5), in which the correction unit is configured to correct timing at which the light receiving unit receives light, or time of flight of the light, on the basis of the correction value.

(7)

The correction device according to any one of (1) to (6), further including a measuring unit that measures timing at which a level of the output signal exceeds a predetermined threshold value.

(8)

The correction device according to any one of (1) to (6), further including a measuring unit to which output timing of light received by the light receiving unit is input, in which the measuring unit is configured to measure a difference between the output timing and timing at which a level of the output signal exceeds a predetermined threshold value.

(9)

The correction device according to any one of (1) to (8), in which the light receiving unit is one in which a frequency distribution of a peak value or an integrated value of the output signal output by receiving light, has a plurality of maximum values corresponding to a photon number.

(10)

The correction device according to (9), in which the light receiving unit includes a plurality of light receiving elements connected together each having an avalanche photodiode and a resistor connected in series to the avalanche photodiode.

(11)

The correction device according to any one of (1) to (10), further including the light receiving unit.

(12)

A correction method including:

counting a photon number on the basis of an output signal output from a light receiving unit with a photon number counting unit;

acquiring a correction value corresponding to the photon number with a correction value acquiring unit; and performing correction based on the correction value with a correction unit.

(13)

A distance measuring device including:

a photon number counting unit that counts a photon number on the basis of an output signal output from a light receiving unit;

a correction value acquiring unit that acquires a correction value corresponding to the photon number;

a correction unit that performs correction based on the correction value; and a distance calculating unit that uses a result of the correction to calculate a distance to a distance measurement target.

(14)

The distance measuring device according to (13), in which the correction unit is configured to correct timing at which the light receiving unit receives light, or time of flight of the light, on the basis of the correction value.

REFERENCE SIGNS LIST 1, 10, 23, 33 Correction device
3 Discretized output type photodetector
4 Timing measurement circuit
5 Photon number counting circuit
6 Shift amount calculation circuit
7, 16, 23e, 33e, 43e Timing correction circuit
12, 23a, 33a, 43a Multi-pixel type SPAD
13, 23b, 33b, 43b, 43c Time-to-digital converter
14, 23c, 33c Integration circuit/converter
15, 23d, 33d, 43d Lookup table reference circuit
20, 30, 40 Distance measuring device
RP Reflected pulsed light
MT Distance measurement target

The invention claimed is:

1. A correction device, comprising:
circuitry configured to:
count a photon number based on an output signal from a light receiving unit, wherein
the circuitry includes an integration circuit, and
the integration circuit is configured to count the photon number based on an integrated value of a peak voltage of the output signal;
acquire a temporal shift amount corresponding to the photon number, wherein the acquired temporal shift amount is with respect to a timing of the output signal; and
perform a correction process based on the acquired temporal shift amount.

2. The correction device according to claim 1, wherein
the circuitry is further configured to count the photon number based on a time difference between a first timing at which a level of the output signal exceeds a first threshold value and a second timing at which the level of the output signal exceeds a second threshold value.

3. The correction device according to claim 1, wherein the circuitry is further configured to output a digital format photon number signal indicating the photon number.

4. The correction device according to claim 1, wherein the circuitry is further configured to refer to a lookup table to acquire a correction value corresponding to the photon number, and
the lookup table includes the correction value corresponding to the photon number.

5. The correction device according to claim 1, wherein the circuitry is further configured to correct one of a timing at which the light receiving unit receives light or a time of flight of the light, based on the acquired temporal shift amount.

6. The correction device according to claim 1, wherein the circuitry is further
configured to measure a timing at which a level of the output signal exceeds a specific threshold value.

7. The correction device according to claim 1, wherein the circuitry is further
configured to:
receive an output timing of light received by the light receiving unit; and
measure a difference between the output timing and a timing at which a level of the output signal exceeds a specific threshold value.

8. The correction device according to claim 1, wherein a frequency distribution of one of a peak value or an integrated value of the output signal has a maximum value corresponding to the photon number.

9. The correction device according to claim 8, wherein
the light receiving unit includes a plurality of light receiving elements connected together, and
each light receiving element of the plurality of light receiving elements includes an avalanche photodiode and a resistor connected in series to the avalanche photodiode.

10. The correction device according to claim 1, further comprising the light receiving unit.

11. A correction method, comprising:
counting, by circuitry, a photon number based on an output signal from a light receiving unit, wherein the circuitry includes an integration circuit;
counting, by the integration circuit, the photon number based on an integrated value of a peak voltage of the output signal;
acquiring, by the circuitry, a temporal shift amount corresponding to the photon number, wherein the acquired temporal shift amount is with respect to a timing of the output signal; and
performing, by the circuitry, a correction process based on the acquired temporal shift amount.

12. A distance measuring device, comprising:
circuitry configured to:
count a photon number based on an output signal from a light receiving unit, wherein
the circuitry includes an integration circuit, and
the integration circuit is configured to count the photon number based on an integrated value of a peak voltage of the output signal;
acquire a temporal shift amount corresponding to the photon number, wherein the acquired temporal shift amount is with respect to a timing of the output signal;
perform a correction process based on the acquired temporal shift amount; and
calculate a distance to a distance measurement target based on a result of the correction process.

13. The distance measuring device according to claim 12, wherein
the circuitry is further configured to correct one of a timing at which the light receiving unit receives light or a time of flight of the light, based on the acquired temporal shift amount.

* * * * *